(No Model.)
C. F. CARLSON.
HUB ATTACHING DEVICE.
No. 490,136. Patented Jan. 17, 1893.
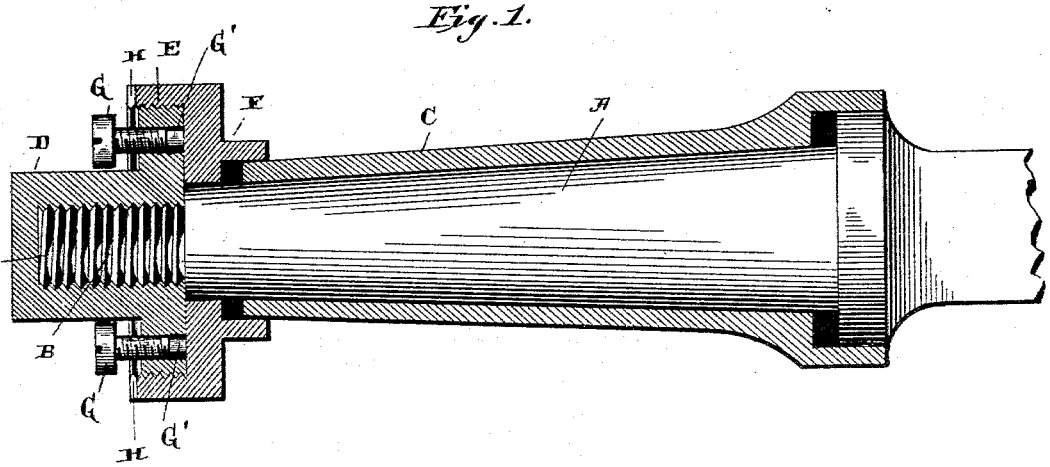
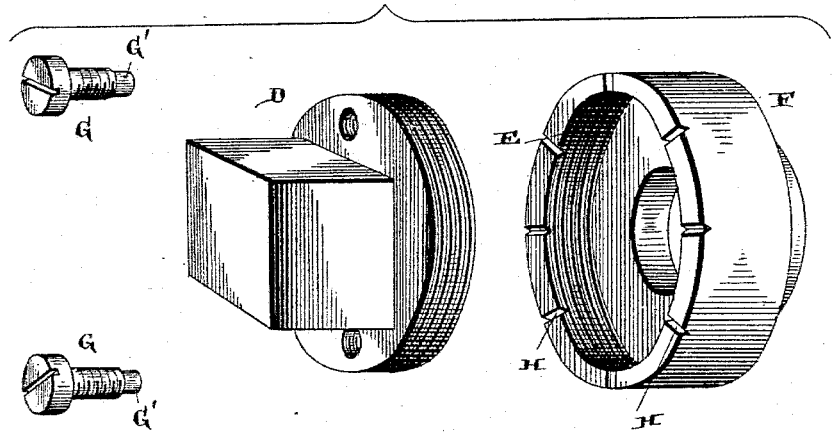

UNITED STATES PATENT OFFICE.

CHARLES FRITZ CARLSON, OF HONOLULU, HAWAII.

HUB-ATTACHING DEVICE.

SPECIFICATION forming part of Letters Patent No. 490,136, dated January 17, 1893.

Application filed April 23, 1892. Serial No. 430,361. (No model.)

*To all whom it may concern:*

Be it known that I, CHARLES FRITZ CARLSON, of Honolulu, Hawaii, have invented certain new and useful Improvements in Hub-Attaching Devices; and I do hereby declare the following to be a full, clear, and exact description of the invention, such as will enable others skilled in the art to which it pertains to make and use it, reference being had to the accompanying drawings, which form part of this specification.

My invention relates to an improvement in hub attaching devices: and it consists in the novel features of construction which will be fully described hereinafter, and more particularly referred to in the claims.

The object of my invention is to provide an improved means for taking up the wear upon axle boxes and hubs, whereby the employment of washers of leather or other material is not necessary.

Referring to the accompanying drawings,— Figure 1, is a sectional view of my improved device showing it in position on the vehicle spindle. Fig. 2, shows the parts in detail.

A, represents the spindle, B, the reduced screw threaded extension on its outer end and C, the wheel box. Adapted to fit the extension B, is the internally screw threaded nut D, of ordinary construction. The inner portion of the periphery of this nut is screw threaded which works in the threads on the inner side of the shoulder E, of the cup-shaped washer. The diameter of the opening in this washer is the same as the diameter of the spindle A, over which it fits so that it can be made to extend inward and follow the boxing C, as the latter wears off from frictional contact with the said cup or washer. When the wheel is new the boxing will be very near the nut D, so that the washer F, at first will be flush with the inner side of the nut, but as the end of the boxing wears the washer acting as a follower will be extended outward from the nut thus taking up the space and preventing lateral play of the wheel on the spindle as will be readily understood.

The washer F, is held rigid with the nut and a given distance therefrom by the screw bolts G, which move longitudinally through screw threaded openings in the nut as shown. The inner ends G', of these bolts are reduced and are not threaded for the reason that these are the points of contact with the washer and if threaded surfaces were exposed to this contact they would soon wear and flatten thus impairing their easy adjustment through the openings in the nut. As the washer F, is run inward on the spindle and away from the inner side of the nut the screws are given a similar inward adjustment, thus preventing the washer from moving back upon the nut from any cause.

The periphery of the shoulder E, of the washer F, is provided with the indentations H, so that it may be readily grasped with a suitable tool while the nut and washer are in position on the vehicle and the washer turned upon the nut and run inward against the boxing C, without removing the wheel. The screws are turned in accordingly and the parts of the device are as perfectly adjusted as regards themselves as before. This last described feature is of great convenience, obviating the necessity of removing the wheel.

Having thus described my invention, I claim

1. The combination of a spindle having a reduced screw threaded end, a nut having a circular inner portion of greater diameter than the spindle and which is screw threaded, a washer adapted to fit closely and move longitudinally on the spindle, circular shoulder E projecting outward from the periphery of the washer and which is screw threaded on its inner side whereby it is adapted to receive the circular screw threaded portion of the nut, substantially as shown and described.

2. In a hub attaching device, the combination with a spindle, a nut therefor and a washer which moves longitudinally on the spindle and nut, of screws or bolts which extend through the nut and which are reduced at their inner ends where they bear against the washer, substantially as shown and described.

3. In a hub attaching device, the combination with a spindle, and a nut therefor having a screw threaded periphery, of a washer adapted to move longitudinally on the spindle, a screw threaded shoulder on the said washer which engages the periphery of the nut, the said shoulder being provided with concavities upon its outer surface, for the purpose substantially as shown and described.

In testimony whereof I affix my signature in presence of two witnesses.

CHARLES FRITZ CARLSON.

Witnesses:
DOROTHEA LAMB,
H. M. DOW.